United States Patent
Excoffier et al.

(10) Patent No.: US 9,600,265 B2
(45) Date of Patent: *Mar. 21, 2017

(54) UPDATING ELEMENTS IN DATA STORAGE FACILITY USING PREDEFINED STATE MACHINE OVER EXTENDED TIME PERIOD

(71) Applicant: INTERNATIONAL BUSINESS MACHINES CORPORATION, Armonk, NY (US)

(72) Inventors: Franck Excoffier, Tucson, AZ (US); Michael P. Groover, Vail, AZ (US); Robin Han, Lincoln, CA (US); Andreas B. M. Koster, Vail, AZ (US); Edward H. Lin, Tucson, AZ (US); Mario Sweeney, Oregon City, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,924

(22) Filed: Feb. 17, 2015

(65) Prior Publication Data
US 2015/0160941 A1 Jun. 11, 2015

Related U.S. Application Data

(63) Continuation of application No. 13/464,098, filed on May 4, 2012, now Pat. No. 8,959,505, which is a
(Continued)

(51) Int. Cl.
*G06F 9/445* (2006.01)

(52) U.S. Cl.
CPC .................................. *G06F 8/65* (2013.01)

(58) Field of Classification Search
None
See application file for complete search history.

(56) References Cited

U.S. PATENT DOCUMENTS

| 5,006,978 A | 4/1991 | Neches |
| 5,410,703 A | 4/1995 | Nilsson et al. |

(Continued)

FOREIGN PATENT DOCUMENTS

| EP | 1096445 | 5/2001 |

OTHER PUBLICATIONS

Anthony Bellissimo et al., "Secure Software Updates: Disappointments and New Challenges", USENIX Association, 2006, <https://www.usenix.org/legacy/event/hotsec06/tech/full_papers/bellissimo/bellissimo.pdf>, pp. 1-7.*

(Continued)

*Primary Examiner* — Geoffrey St Leger
(74) *Attorney, Agent, or Firm* — Griffiths & Seaton PLLC

(57) ABSTRACT

A sequence for distributing at least one of a plurality of code packages to the at least one facility according to different states of a fixed state machine is set. The at least one of the plurality of code packages is maintained in at least one staging area in a valid, dormant mode while the fixed state machine is stopped. Pursuant to a resumption of the fixed state machine at a subsequent time, a current code package is swapped with the at least one of the plurality of code packages in the at least one staging area to activate the at least one of the plurality of code packages.

22 Claims, 2 Drawing Sheets

Related U.S. Application Data continuation of application No. 12/769,763, filed on Apr. 29, 2010, now Pat. No. 8,881,134.

(56) References Cited

U.S. PATENT DOCUMENTS

| | | | |
|---|---|---|---|
| 5,465,361 A * | 11/1995 | Hoenninger, III | G06F 8/54 324/309 |
| 5,713,024 A | 1/1998 | Halladay | |
| 5,870,539 A | 2/1999 | Schaffer | |
| 5,971,851 A | 10/1999 | Pascal et al. | |
| 6,151,657 A | 11/2000 | Sun et al. | |
| 6,269,480 B1 | 7/2001 | Curtis | |
| 6,301,708 B1 | 10/2001 | Gazdik et al. | |
| 6,308,326 B1 | 10/2001 | Murphy et al. | |
| 6,321,350 B1 | 11/2001 | Baskey et al. | |
| 6,324,691 B1 | 11/2001 | Gazdik | |
| 6,397,242 B1 | 5/2002 | Devine et al. | |
| 6,438,749 B1 | 8/2002 | Chamberlain | |
| 6,457,122 B1 * | 9/2002 | Ramezani | G06F 11/1433 713/1 |
| 6,484,315 B1 * | 11/2002 | Ziese | G06F 8/65 707/999.202 |
| 6,496,977 B1 | 12/2002 | Hamilton et al. | |
| 6,507,948 B1 * | 1/2003 | Curtis | G06F 8/30 717/174 |
| 6,536,038 B1 | 3/2003 | Ewertz et al. | |
| 6,606,744 B1 * | 8/2003 | Mikurak | H04L 29/06 717/174 |
| 6,708,332 B2 * | 3/2004 | Murphy | G06F 8/67 717/111 |
| 7,191,437 B1 | 3/2007 | Coatney et al. | |
| 7,203,940 B2 | 4/2007 | Bartmeller et al. | |
| 7,353,511 B1 * | 4/2008 | Ziese | G06F 8/65 717/172 |
| 7,509,654 B2 | 3/2009 | Jennings et al. | |
| 7,574,481 B2 | 8/2009 | Moore et al. | |
| 7,581,029 B2 | 8/2009 | Dubal et al. | |
| 7,661,018 B2 | 2/2010 | Brundidge et al. | |
| 7,685,461 B2 | 3/2010 | Brundidge et al. | |
| 7,823,145 B1 | 10/2010 | Le et al. | |
| 8,881,134 B2 * | 11/2014 | Excoffier | G06F 8/65 717/168 |
| 8,959,505 B2 * | 2/2015 | Excoffier | G06F 8/65 717/168 |
| 2002/0092010 A1 | 7/2002 | Fiske | |
| 2002/0144256 A1 * | 10/2002 | Budhiraja | G06F 8/67 717/174 |
| 2002/0188711 A1 * | 12/2002 | Meyer | G06F 3/0605 709/223 |
| 2003/0182411 A1 | 9/2003 | Wang et al. | |
| 2003/0204843 A1 | 10/2003 | Barmettler et al. | |
| 2003/0237081 A1 | 12/2003 | Taylor | |
| 2004/0163081 A1 | 8/2004 | Martwick | |
| 2005/0193385 A1 | 9/2005 | De Heer et al. | |
| 2005/0216904 A1 | 9/2005 | Needham | |
| 2006/0069849 A1 | 3/2006 | Rudelic | |
| 2006/0112387 A1 | 5/2006 | Butt et al. | |
| 2006/0130046 A1 | 6/2006 | O'Neill | |
| 2006/0224793 A1 | 10/2006 | Purlia | |
| 2006/0248172 A1 | 11/2006 | Zurakawa et al. | |
| 2006/0282419 A1 | 12/2006 | Sen et al. | |
| 2006/0282831 A1 | 12/2006 | Toeroe | |
| 2007/0006214 A1 | 1/2007 | Dubal et al. | |
| 2007/0169075 A1 | 7/2007 | Lill et al. | |
| 2007/0230493 A1 | 10/2007 | Dravida et al. | |
| 2008/0046878 A1 | 2/2008 | Anderson | |
| 2008/0141244 A1 * | 6/2008 | Kelley | G06F 8/61 717/178 |
| 2009/0113408 A1 | 4/2009 | Toeroe | |
| 2009/0199175 A1 * | 8/2009 | Keller | G06F 8/61 717/178 |
| 2009/0222916 A1 | 9/2009 | Blaisdell | |

OTHER PUBLICATIONS

Cao Yang et al., "Secure Method for Software Upgrades for Implantable Medical Devices", IEEE, 2010, <http://ieeexplore.ieee.org/stamp/stamp.jsp?tp=&arnumber=6076155>, pp. 1-9.*

Andreas Heiner et al., "Secure Software Installation in a Mobile Environment", Nokia Coporation m 2007, <http://delivery.acm.org/10.1145/1290000/1280705/p155-heiner.pdf>, pp. 1-2.*

Zhang et al., "An Efficient Signature Machine Scheme for Mobile Security" vol. E91-B, No. 10, Oct. 2008, IEICE Trans. Commun.

"Software for Embedded Systems" pp. 1-13, http://courses.cs.washington.edu/courses/cse466/02au/Lectures/State-models.pdf, University of Washington, 2011.

International Search Report for Counterpart Application No. PCT/EP2011/056217, Jul. 29, 2011.

Dalal et al., "A Hardware Framework for the Fast Generation of Multiple Long-Period Random Number Streams" pp. 245-254, FPGA Feb. 2008, ACM 978-1-59593-934-0/08/02.

"Test Function Embedding Algorithms with Application to Interconnected Finite State Machines", "Test Function Embedding Algorithms with Application to Interconnected Finite State Machines" pp. 1-13, htto://ieeeexplore.ieee.org/stamp/stamp.jsp?tp=&arnumber=406713, IEEE, 1995.

MacCormick et al., "Kinesis: A New Approach to Replica Placement in Distributed Storage Systems" 28 pages, vol. 4, No. 4, Article 11, Jan. 2009, ACM Transactions on Storage.

Cao Yang et al., Secure Method for Software Upgrades for Implantable Medical Devices9 pages.

Andreas Heiner et al., Secure Software Installation in a Mobile Environment2 pages.

Anthony Bellissimo et al., Secure Software Updates: Disappointments and New Challenges7 pages.

"Inferring Finite-State Models with Temporal Constraints" pp. 248-257, http://delivery.acm/org/10.1145/1650000/1642962/04639328.pdf, ACM, 2008.

* cited by examiner

UPDATING ELEMENTS IN DATA STORAGE FACILITY USING PREDEFINED STATE MACHINE OVER EXTENDED TIME PERIOD

CROSS-REFERENCE TO RELATED APPLICATIONS

This Application is a Continuation of U.S. patent application Ser. No. 13/464,098, filed on May 4, 2012, which is a Continuation of U.S. Pat. No. 8,881,134, filed on Apr. 29, 2010, the contents of both of which are hereby incorporated by reference in their entirety.

FIELD OF THE INVENTION

The present invention relates in general to computers, and more particularly to apparatus, method and computer program product embodiments updating elements in a multi-server data storage facility using a state machine over an extended period of time.

DESCRIPTION OF THE RELATED ART

Storage facilities such as storage servers as commonly used by corporations and other organizations have high-capacity disk arrays to store large amounts of data from external host systems. A storage facility may also backup data from another storage facility, such as at a remote site. The IBM® Enterprise Storage Server (ESS) is an example of such a storage facility. Such facilities can access arrays of disks or other storage media to store and retrieve data. Moreover, redundant capabilities may be provided as a further safeguard against data loss. For example, a dual server system includes two separate servers that can access the same storage disks.

Moreover, storage facilities include several subsystems and components, referred to as updateable elements, each requiring its own unique update image and update commands. The elements are updated from time to time to provide new features or fix problems, for instance. Elements that may be updated include host adapters, device adapters, service processors, storage disks, power components, and so forth.

SUMMARY OF THE DESCRIBED EMBODIMENTS

The process of updating a storage facility server may involve several layers of hardware, firmware, and software. The complexity involved in handling these components causes code updates to potentially take a significant amount of time. In order to reduce the maintenance time window of a system (which may include one or more complex with virtualized storage facilities), current approaches separate the installation and activation of the new level of code. In implementations where a fixed state machine is utilized to perform the updates, difficulties may arise if the updates are performed over an extended period of time, as the state of the machine may change due to external activity. In a short time window, this issue is handled using a lock mechanism, however the capabilities of the storage facility are restricted during this time.

In view of the foregoing, a need exists for a mechanism whereby updates may be performed for a larger period of time, without any accompanying restrictions on the storage facility. Accordingly, various embodiments for updating at least one facility in a computing storage environment are provided. In one embodiment, by way of example only, a sequence for distributing at least one of a plurality of code packages to the at least one facility according to different states of a fixed state machine is set. The at least one of the plurality of code packages is maintained in at least one staging area in a valid, dormant mode while the fixed state machine is stopped. Pursuant to a resumption of the fixed state machine at a subsequent time, a current code package is swapped with the at least one of the plurality of code packages in the at least one staging area to activate the at least one of the plurality of code packages.

In addition to the foregoing exemplary embodiment, various other method embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments provide mechanisms for updating a facility, for example in a fixed state machine implementation, over an extended period of time. These mechanisms improve current designs by providing a self-configuring and self re-synchronizing system, allowing extension of a state machine capacity from hours/days to weeks/months, for example.

The mechanisms of the illustrated embodiments enhance the fixed state machine implementation by, for example, (1) extending the length of usage of the state machine during a code load process from hours to weeks, and (2) allowing for the distribution of the state machine in a multi-head configuration, such that one management system may be configured to implement code distribution, and another management system may be configured to implement code activation.

The mechanisms of the illustrated embodiments provide several advantages, including minimization of storage facility usage restrictions, facilitation of ease of management of the maintenance time window due to the capability of handling extended periods of time between states of the engine, promotion of the aforementioned multi-head configuration of implementations for load balancing and other advantages, and toleration to system faults and flexibility to perform service in various stages of the state machine.

As previously mentioned, from time to time it is necessary to update code used by different elements in a storage facility. In one implementation, such code is commonly referred to as Licensed Maintenance Code (LMC). The Storage Facility includes several subsystems and components, referred to as updateable elements, each requiring its own unique update image and update commands.

Figure 1:
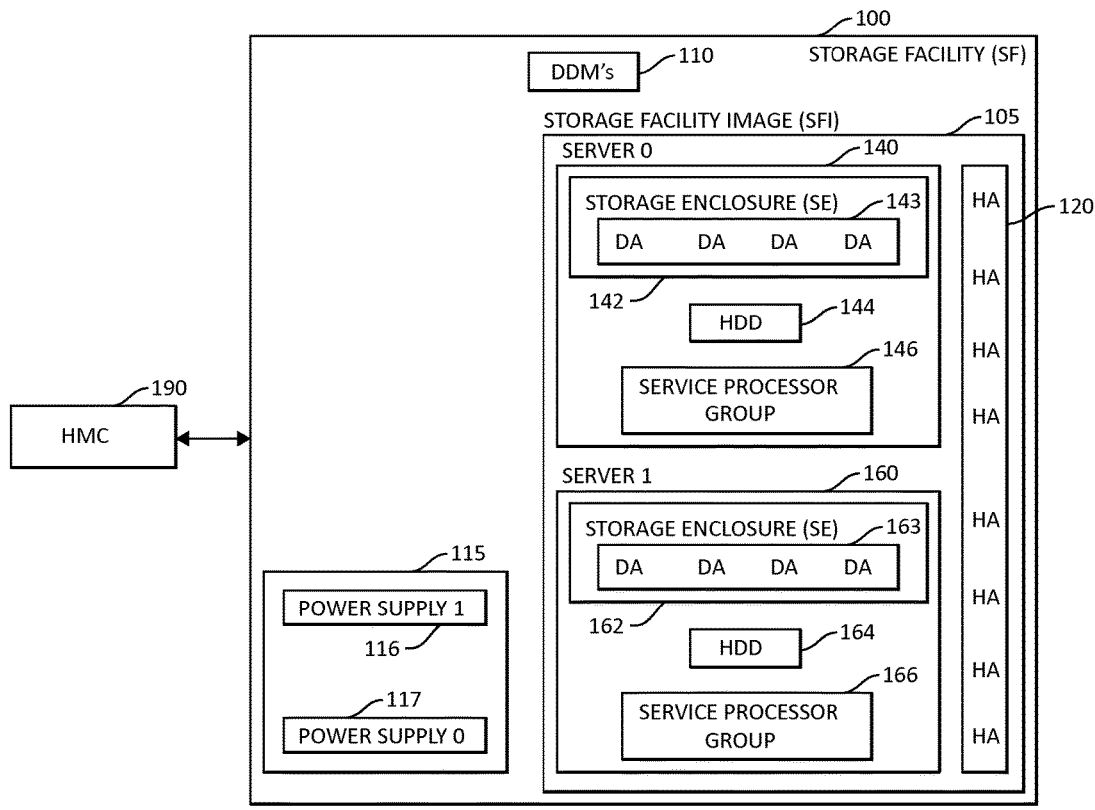
FIG. 1 illustrates a block diagram of an exemplary storage facility capable of implementing various aspects of the present invention.

FIG. 1 illustrates a block diagram of an exemplary facility (i.e., Storage Facility) in which aspects of the present invention may be implemented. An overall product includes a Hardware Management Console (HMC) 190, such as a laptop computer, and at least one Storage Facility (SF) 100. The example Storage Facility (SF) 100 includes at least one Storage Facility Image (SFI) 105 and a power supply group 115, which includes power supplies 116 and 117. In particular, the power supply group 115 includes a rack power control (RPC) and a primary power supply (PPS), which may be treated as one unit for the purposes of updating code. The SFI includes two servers (redundant servers) S0 (140) and S1 (160, and several disk drive modules (DDMs) 110, Which are data storage devices for customer data, and several host adapters (HAs) 120. HAs are physical subunits of a storage server that provide the ability to attach to one or more host I/O interfaces.

Each server 140, 160 includes at least one hard disk drive (HDD) 144, 164, also referred to as a logical partition (LPAR), at least two device adapters (DAs), 143, 163, housed in at least one storage enclosure (SE) 142, 162, and a service processor group 146, 166, respectively, (sometimes referred to as Computer-Electronic Complexes (CECs)). A CEC is the set of hardware facilities associated with each server 140, 160. DAs are physical components of the Storage Facility 100 that provide communication between the servers 140, 160 and the DDMs 110.

Each of the HDDs 144, 164 has an operating system running on it, such as IBM®'s AIX 5 L operating system software, along with a driver, also referred to as SFI code. The SFI has numerous components with code for each component. The SFI code can be thought of as the main code which coordinates the activities of most of the other components and code. One aspect of the illustrated embodiments involves, in part, updating the operating system and SFI code onto the HDDs 144, 164. The service processor groups 146, 166 and the HDDs 144, 164, respectively, combine to provide the server foundation, yet the server is incomplete without the other elements.

Typically, when a code update is needed, a technician is dispatched to the location of the Storage Facility and uses the HMC 190 to perform the updates. Alternatively, the customer may use the HMC 190 to perform the updates. Furthermore, the update may be done remotely. The HMC 190 may have the code for updating the elements stored locally, such as on a CD-ROM, or may access such code via a web site, for example. Generally, the updateable elements include the HDD 144, 164, host adapters 120, power supply component 115, DDMs 110, storage enclosures 142, 162, device adapters 143, 163, and service processor groups 146, 166.

Figure 2:
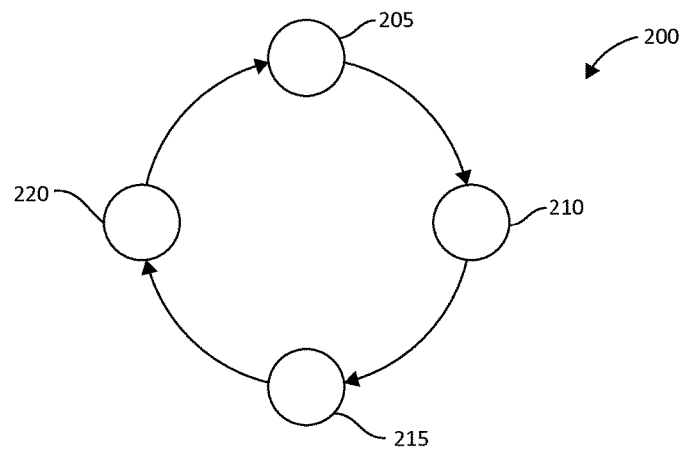
FIG. 2 illustrates an exemplary state machine for carrying out an update process.

FIG. 2, following, illustrates an exemplary state machine for carrying out an update process. One aspect of the present invention coordinates the update actions for each of the updateable elements in the context of a fixed state machine that traverses different states in a fixed sequence. The traversal of the states is repeated in successive cycles or loops. For example, a simplified state machine 200 includes states 205, 210, 215 and 220, which are traversed one at a time in the sequence shown. In practice, the present invention can traverse dozens or hundreds of different states, although an action is not necessarily performed for each updateable element in each state. Each state is associated with one or more actions that are performed in updating the elements, as detailed below.

In one embodiment, the mechanisms of the present invention may proceed in an exemplary process, following. On media insertion or network download, the process identifies a new code level is available and searches for virtualized storage facilities attached that would be candidate for this new level. Once this is complete, the state machine is automatically configured and started.

As a next step in the exemplary process, the state engine installs the new code level in a staging area, fully ready for activation (outside of the user's maintenance time window). Once this is complete, the state engine is stopped for an extended period of time (days or weeks). During this period of time the state of the storage facility can be modified in 2 ways: accidental, some kind of failure due to wearing out or other environmental issues, and normal activity, where new functions were activated, storage capacity was changed, and the like.

In one embodiment, the accidental issues may be detected via a 'smart' periodic verification of the storage facility. In other words, if issues have been detected on an earlier run and have not been fixed, the process does not continue to implement the overhead of an extended diagnostic. The changes due to normal activity are not detected until the state machine is resumed by a management system. This management system may be the same system or another management system in a multi-head configuration as previously described. A delta (e.g., difference between the state change and update) is then identified and resynchronized with the staging area, allowing the state machine to continue with an accurate state without restricting any of the management activity.

To better describe the foregoing exemplary process, consider the following exemplary detail of such process. Again, as a first step, media with the code level is detected. The media may be inserted or otherwise put in communication with the facility. This process may be performed by a user, service personnel, or by remote access, for example. As a next step, the state engine verifies the code validity and suitability on all attached virtualized storage facilities. Once candidates are identified, the code is installed in various staging areas of the differing hardware, firmware, and/or software in the virtualization engine and virtual storage facilities. At this point in the process, the entire storage facility is considered by the state engine to be in a valid state.

Following installation, the process may enter a dormant mode for an extended period of time (e.g., weeks). Any accidental failure will be detected, and support personnel may be then notified for repair/replacement. At a subsequent time, the process may the be resumed for an activation phase, the state delta is identified and corrected on the staging area, and the storage facility may then quickly swap the staging area with the active area with minimal disruption.

To accommodate state changes that occur during the dormant period, here again two scenarios are possible. For accidental changes, support may be notified to repair/replace the failing component. Once the repair is complete, the storage facility is either in a valid state (same as before the accident), or having a modified configuration depending on the repair procedure. In the first case, the state machine need not perform any additional activity. However, if the repair caused replacement of one or more components, a resynchronization system may be implemented as described below for normal activity changes.

For normal activity changes (e.g., modifications to the storage facility such as addition of hardware, activation of license keys, changes in logical configuration, and the like), differences between one or more staging areas, when restarting the state engine, may exist. These differences may then be analyzed and synchronized/resynchronized, bringing the modified state to a valid state, and allowing the update process to then continue. Finally, where no changes have occurred, once the state engine resumes, the update process continues as previously.

Figure 3:
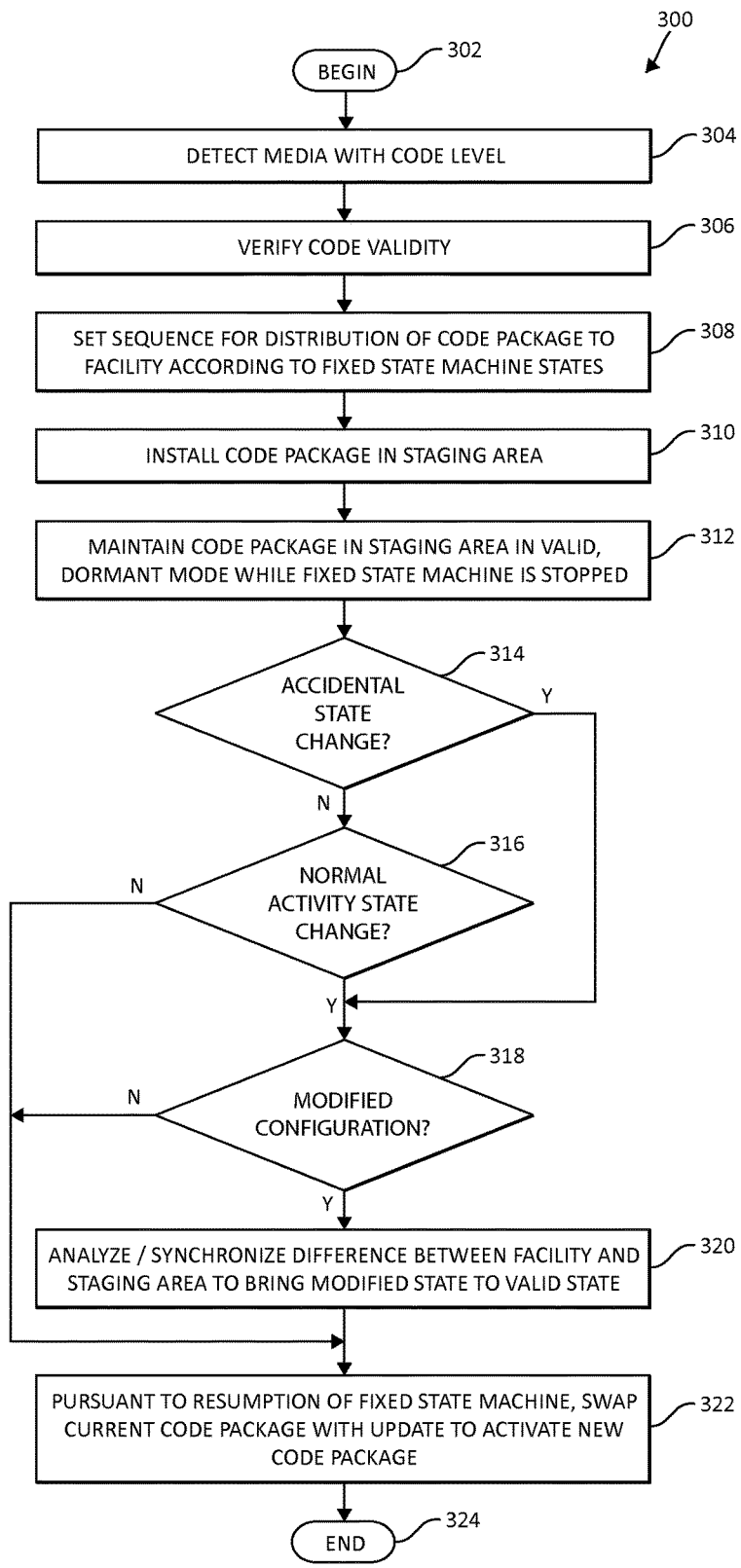
FIG. 3 illustrates a flow chart diagram of an exemplary method for updating a facility in a computing storage embodiment according to one embodiment of the present invention.

Turning to FIG. 3, following, an exemplary method 300 for updating at least one facility in a computing environment (such as a storage facility in a computing storage environment) is illustrated in flow chart diagram format. As one of ordinary skill in the art will appreciate, various steps in the method 300 may be implemented in differing ways to suit a particular application. In addition, the described method 300 may be implemented by various means, such as hardware, software, firmware, or a combination thereof operational on or otherwise associated with the computing environment. For example, the method 300 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 300 begins (step 302) by detection of media having the code level to be updated to the elements in the respective facility (step 304). The code validity is verified (step 306) and a sequence for distribution of the code package to the facility is set according to fixed state machine states (step 308). The code package is then installed in a staging area (step 310) where it is maintained in a valid, dormant mode while the fixed state machine is then stopped (step 312).

During the dormant mode, as previously indicated, various factors may cause a state machine change that should be addressed previous to a resumption of the state machine to activate the update. If, during this period, an accidental state change occurs (such as a hardware, software, or firmware failure, error, or other change as previously described), and the activity results in a modification of the configuration of the updatable element (step 318), then the synchronization/re-synchronization mechanism previously described is implemented to analyze and synchronize differences between the facility and staging area to bring the modified state again to a valid state (step 322).

Returning to step 314, if an accidental state change does not occur, but a normal activity state change occurs (step 316), again resulting in a modification of the configuration of the updatable element, the synchronization mechanism previously described again is implemented (again, step 320). If neither an accidental or normal activity change occurs during the dormancy, following a subsequent amount of time the fixed state machine is again resumed, and the current code package is swapped with the update (in its valid state) to activate the new code package.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for updating at least one facility in a computing storage environment by a processor device, comprising:
   setting a sequence for distributing at least one of a plurality of code packages to the at least one facility according to different states of a fixed state machine;
   detecting a change in the fixed state machine;
   determining whether the fixed state machine change is an accidental state change resulting in a modification of the configuration of an updateable element;
   if the fixed state machine change is not an accidental state change, determining whether the fixed state machine change results in a modification of the configuration of an updateable element;
      if the fixed state machine change results in a modification of the configuration of the updateable element, then analyzing and synchronizing the modification to bring the fixed state machine to a valid state; and
      if the fixed state machine change does not result in a modification, maintaining the fixed state machine in the valid state;
   if the fixed state machine change is an accidental state change, notifying support personnel for repair or replacement of a failing part causing the accidental state change;
      if the repair results in a modification of the configuration of the updateable element of the at least one of the plurality of code packages maintained in at least one staging area, analyzing and synchronizing the modification to bring the fixed state machine to the valid state;
      if the repair does not result in a modification of the configuration of the updateable element of the at least one of the plurality of code packages maintained in the at least one staging area, placing the fixed state machine in the valid state; and
   pursuant to a resumption of the fixed state machine at a subsequent time after the fixed state machine is brought to the valid state, swapping a current code package with the at least one of the plurality of code packages in the at least one staging area to activate the at least one of the plurality of code packages.

2. The method of claim 1, further including identifying the at least one facility as an update candidate.

3. The method of claim 1, further including periodically performing a verification procedure on the at least one facility.

4. The method of claim 3, further including, pursuant to periodically performing the verification procedure on the at least one facility, detecting a modification to the at least one facility.

5. The method of claim 4, wherein the detecting the modification to the at least one facility further includes at least one of detecting a hardware addition, detecting a license activation, and detecting a logical configuration change.

6. The method of claim 4, further including, pursuant to the detecting the modification to the at least one facility, identifying at least one difference between the at least one of the plurality of code packages and a current code level in the at least one facility.

7. The method of claim 6, further including, pursuant to the identifying at least one difference between the at least one of the plurality of code packages and the current code level in the at least one facility, synchronizing the at least one of the plurality of code packages in the at least one staging area and the current code level in the at least one facility.

8. The method of claim 7, further including, subsequent to synchronizing the at least one of the plurality of code packages in the at least one staging area and the current code level in the at least one facility, performing the resumption of the fixed state machine.

9. A system for updating at least one facility in a computing storage environment, comprising:
   at least one processor device, operable in the computing storage environment, wherein the at least one processor device is adapted for:

setting a sequence for distributing at least one of a plurality of code packages to the at least one facility according to different states of a fixed state machine, detecting a change in the fixed state machine;

determining whether the fixed state machine change is an accidental state change resulting in a modification of the configuration of an updateable element;

if the fixed state machine change is not an accidental state change, determining whether the fixed state machine change results in a modification of the configuration of an updateable element;

if the fixed state machine change results in a modification of the configuration of the updateable element, then analyzing and synchronizing the modification to bring the fixed state machine to a valid state; and if the fixed state machine change does not result in a modification, maintaining the fixed state machine in the valid state;

if the fixed state machine change is an accidental state change, notifying support personnel for repair or replacement of a failing part causing the accidental state change;

if the repair results in a modification of the configuration of the updateable element of the at least one of the plurality of code packages maintained in at least one staging area, analyzing and synchronizing the modification to bring the fixed state machine to the valid state;

if the repair does not result in a modification of the configuration of the updateable element of the at least one of the plurality of code packages maintained in the at least one staging area, placing the fixed state machine in the valid state; and pursuant to a resumption of the fixed state machine at a subsequent time after the fixed state machine is brought to the valid state, swapping a current code package with the at least one of the plurality of code packages in the at least one staging area to activate the at least one of the plurality of code packages.

10. The system of claim 9, wherein the at least one processor device is further adapted for identifying the at least one facility as an update candidate.

11. The system of claim 9, wherein the at least one processor device is further adapted for periodically performing a verification procedure on the at least one facility.

12. The system of claim 9, wherein the at least one processor device is further adapted for, pursuant to the detecting a change in the fixed state machine, performing at least one of detecting a hardware addition, detecting a license activation, and detecting a logical configuration change.

13. The system of claim 12, wherein the at least one processor device is further adapted for, pursuant to the detecting a change in the fixed state machine, identifying at least one difference between the at least one of the plurality of code packages and a current code level in the at least one facility.

14. The system of claim 13, wherein the at least one processor device is further adapted for, pursuant to the identifying at least one difference between the at least one of the plurality of code packages and the current code level in the at least one facility, synchronizing the at least one of the plurality of code packages in the at least one staging area and the current code level in the at least one facility.

15. The system of claim 14, wherein the at least one processor device is further adapted for, subsequent to synchronizing the at least one of the plurality of code packages in the at least one staging area and the current code level in the at least one facility, performing the resumption of the fixed state machine.

16. The system of claim 9, wherein the at least one facility is a computing storage facility, and the at least one processor device is operable as at least a portion of a service processor group in the computing storage facility.

17. A computer program product for updating at least one facility in a computing storage environment by a processor device, the computer program product comprising a non-transitory computer-readable storage medium having computer-readable program code portions stored therein, the computer-readable program code portions comprising:

a first executable portion for setting a sequence for distributing at least one of a plurality of code packages to the at least one facility according to different states of a fixed state machine;

a second executable portion for detecting a change in the fixed state machine;

a third executable portion for determining whether the fixed state machine change is an accidental state change resulting in a modification of the configuration of an updateable element;

a fourth executable portion for, if the fixed state machine change is not an accidental state change, determining whether the fixed state machine change results in a modification of the configuration of an updateable element, if the fixed state machine change results in a modification of the configuration of the updateable element, then analyzing and synchronizing the modification to bring the fixed state machine to a valid state, and if the fixed state machine change does not result in a modification, maintaining the fixed state machine in the valid state;

a fifth executable portion for, if the fixed state machine change is an accidental state change, notifying support personnel for repair or replacement of a failing part causing the accidental state change, if the repair results in a modification of the configuration of the updateable element of the at least one of the plurality of code packages maintained in at least one staging area, analyzing and synchronizing the modification to bring the fixed state machine to the valid state, and if the repair does not result in a modification of the configuration of the updateable element of the at least one of the plurality of code packages maintained in the at least one staging area, placing the fixed state machine in the valid state; and a sixth executable portion for, pursuant to a resumption of the fixed state machine at a subsequent time after the fixed state machine is brought to the valid state, swapping a current code package with the at least one of the plurality of code packages in the at least one staging area to activate the at least one of the plurality of code packages.

18. The computer program product of claim 17, further including a seventh executable portion for identifying the at least one facility as an update candidate.

19. The computer program product of claim 18, further including an eighth executable portion for, pursuant to the identifying the at least one facility as the update candidate, periodically performing a verification procedure on the at least one facility.

20. The computer program product of claim 17, further including an eighth executable portion for, pursuant to the detecting a change in the fixed state machine, identifying at least one difference between the at least one of the plurality of code packages and a current code level in the at least one facility.

21. The computer program product of claim 20, further including a ninth executable portion for, pursuant to the identifying at least one difference between the at least one of the plurality of code packages and the current code level in the at least one facility, synchronizing the at least one of the plurality of code packages in the at least one staging area and the current code level in the at least one facility.

22. The computer program product of claim 21, further including a tenth executable portion for, subsequent to synchronizing the at least one of the plurality of code packages in the at least one staging area and the current code level in the at least one facility, performing the resumption of the fixed state machine.

* * * * *